United States Patent [19]

Tonks

[11] Patent Number: 5,129,225

[45] Date of Patent: Jul. 14, 1992

[54] DIVERTER VALVE

[75] Inventor: Robert C. Tonks, Bridgwater, England

[73] Assignee: Rolls-Royce plc, London, England

[21] Appl. No.: 557,026

[22] Filed: Jul. 25, 1990

[30] Foreign Application Priority Data

Aug. 5, 1989 [GB] United Kingdom ............... 8917962

[51] Int. Cl.$^5$ ............................................. F02K 3/02
[52] U.S. Cl. ............................ 60/226.3; 60/39.07; 251/304
[58] Field of Search ............... 60/226.3, 270.1, 39.29, 60/39.07, 39.161, 226.1; 251/304

[56] References Cited

U.S. PATENT DOCUMENTS

| | | | |
|---|---|---|---|
| 3,779,282 | 12/1973 | Klees | 60/226.3 |
| 3,841,091 | 10/1974 | Sargisson et al. | 60/224 |
| 4,033,119 | 7/1977 | Nichols | 60/226.3 |
| 4,038,818 | 8/1977 | Snell | 60/226.3 |
| 4,060,981 | 12/1977 | Hampton | 60/226.3 |
| 4,712,370 | 12/1987 | MacGee | 60/39.07 |
| 4,782,659 | 11/1988 | Lewis et al. | 60/39.161 |

FOREIGN PATENT DOCUMENTS

| | | | |
|---|---|---|---|
| 0156933 | 10/1985 | European Pat. Off. | 60/226.3 |
| 2148521 | 3/1973 | France . | |
| 2243330 | 4/1975 | France . | |
| 1364692 | 8/1974 | United Kingdom . | |
| 1483813 | 8/1974 | United Kingdom . | |
| 1389347 | 4/1975 | United Kingdom . | |

Primary Examiner—Richard A. Bertsch
Assistant Examiner—Michael I. Kocharov
Attorney, Agent, or Firm—Oliff & Berridge

[57] ABSTRACT

In a tandem fan gas turbine engine two fan compressor stages are provided connected by a flow duct housing a diverter valve which can be used to admit the flow from the first fan to the second fan or to divert it to exhaust through an auxiliary outlet in which case the second fan draws ambient air in through an auxiliary inlet. The connecting duct is annular in cross section because an inner cylindrical wall surrounds the shaft driving the front fan. The diverter valve which therefore has to operate in the annular duct comprises a pair of flat side lobes connected by curved plates which straddle the inner wall. The valve is operated by a rotary actuator in synchronism with closure means which obstruct or open the auxiliary outlet and inlet.

14 Claims, 3 Drawing Sheets

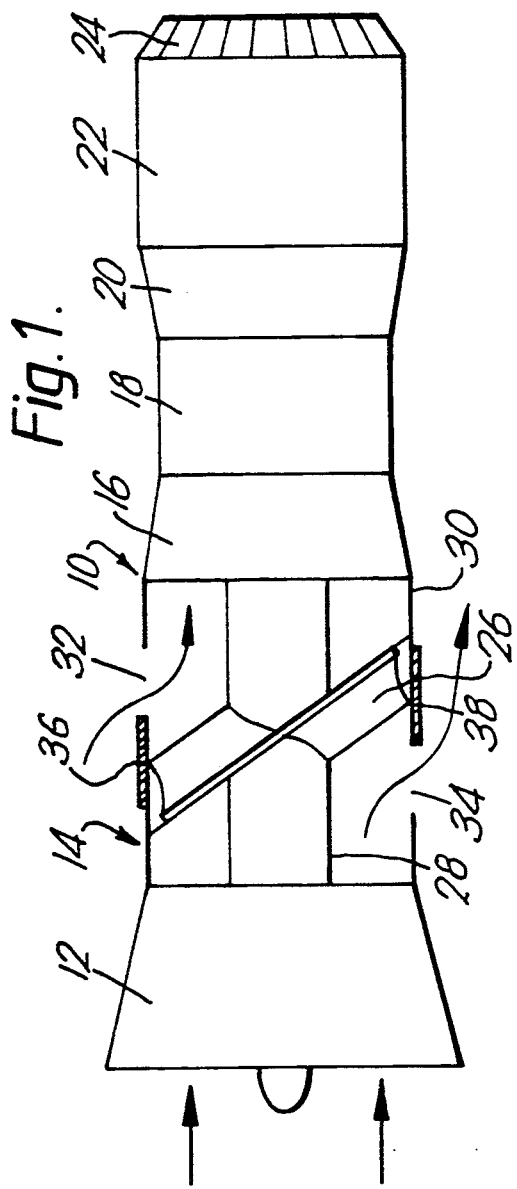
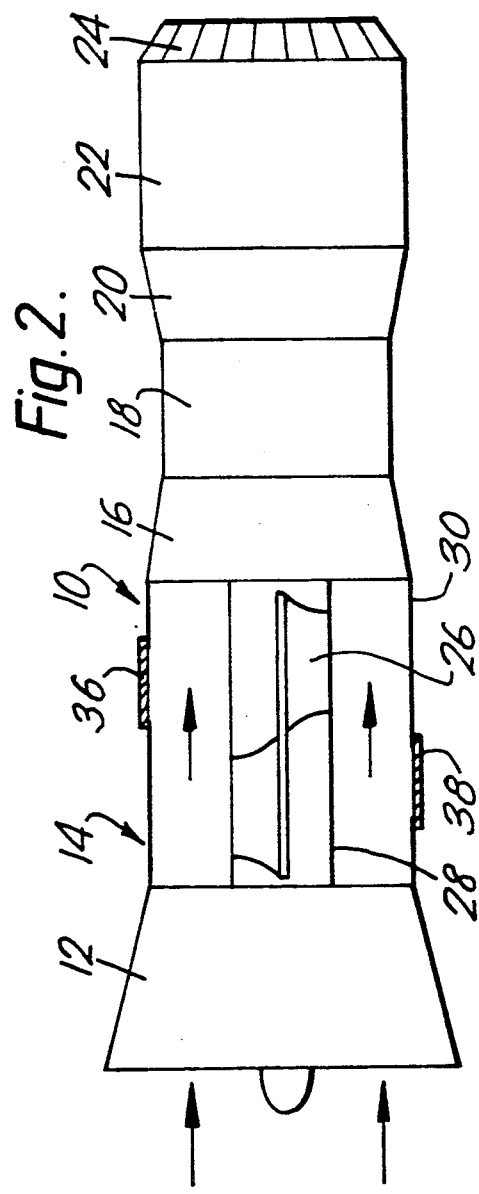

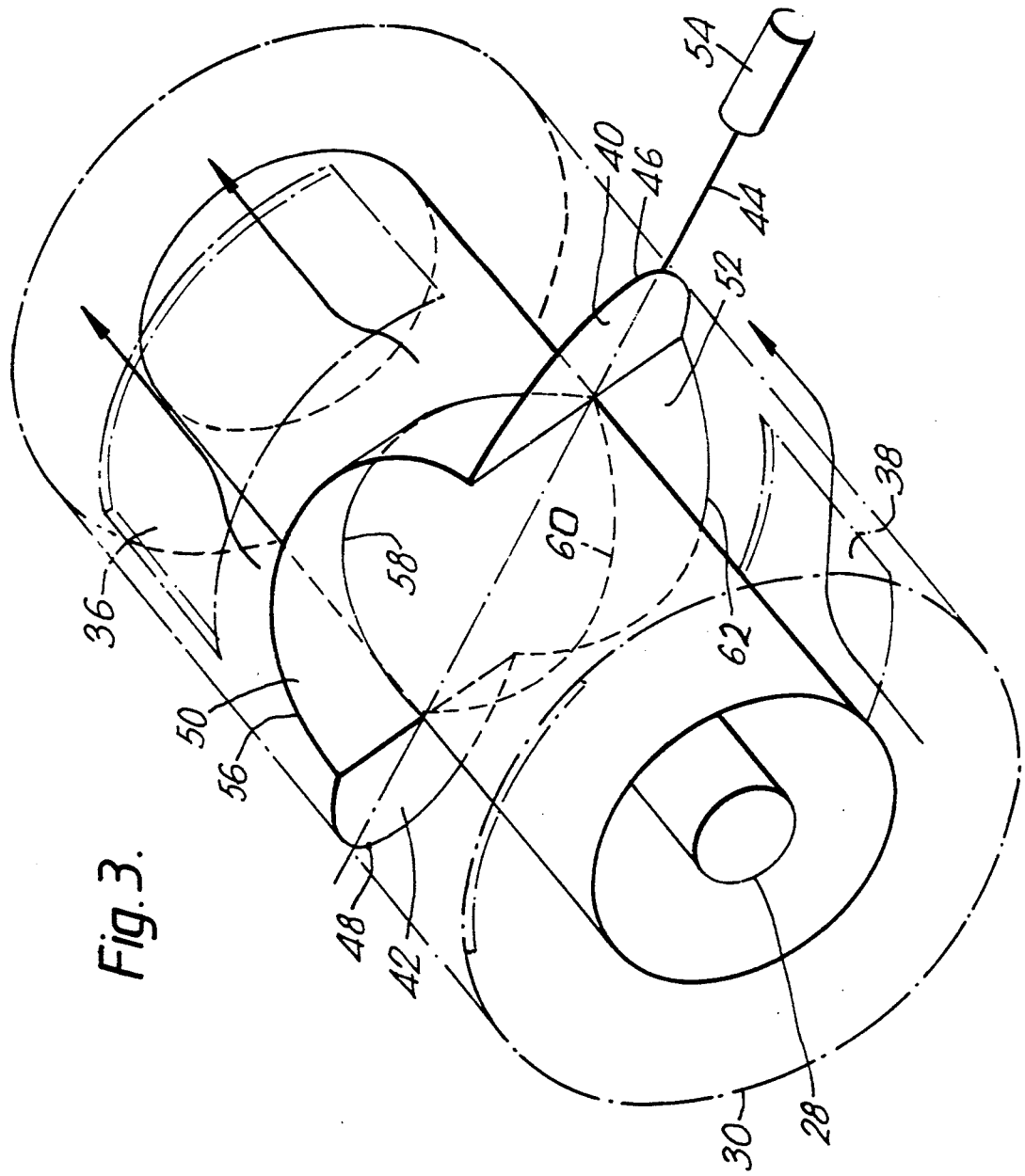

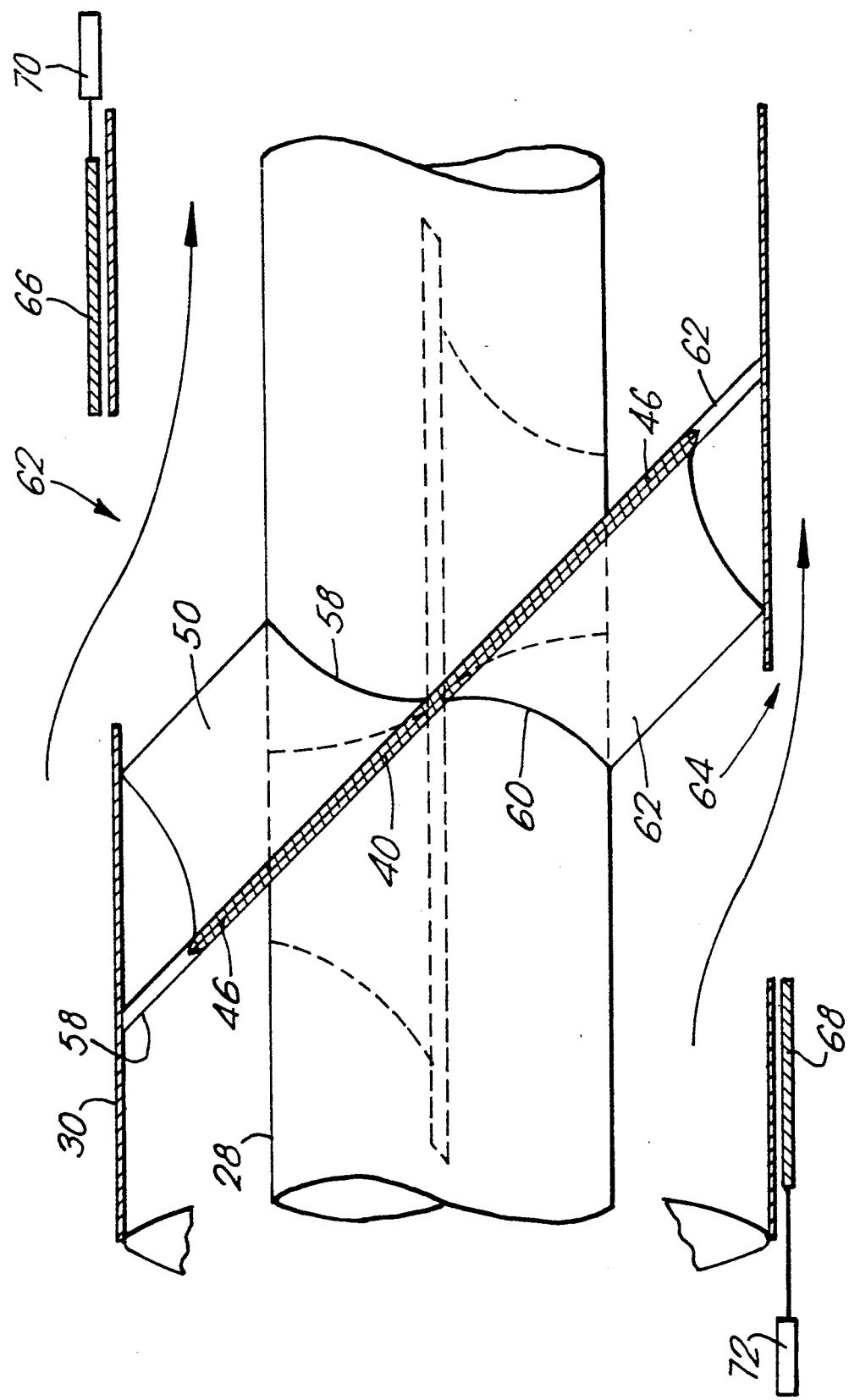

DIVERTER VALVE

BACKGROUND OF THE INVENTION

1. Field of the Invention

The invention relates to a diverter valve for a variable cycle gas turbine engine, and particularly to a valve for selectively changing the flowpath of working fluid through a tandem fan engine.

2. Description of the Related Art

The present invention is particularly concerned with variable cycle gas turbine engines of the type described in our UK Patents Nos GB 1,389,347 and GB 1,415,679. These engines have a first axial flow compressor, sometimes referred to as a front fan and a core engine incorporating a further fan type compressor, thus giving rise to the idea of tandem fans. The two compressor fan stages may be driven by separate turbines.

A tandem fan engine can be operated alternatively in series-flow or parallel-flow modes. In the first the whole of flow output of the first fan is ducted to the second compressor fan thereby effectively supercharging the core engine. In the alternative the flow output of the front fan is discharged from the communicating duct and the second fan draws air into the core engine through an auxiliary inlet. The flow from the first fan may be discharged into a by-pass duct or directed to one or more discharge nozzles, these may be fixed or vectorable.

To selectively redirect the fluid flowpath in the communicating duct between the two fan stages a diverter valve is provided, together with auxiliary inlet and outlet apertures. Examples of diverter valves are described in the above mentioned patents. The present invention is intended to provide a simpler valve design which is lighter and more efficient than these earlier proposals.

SUMMARY OF THE INVENTION

According to the present invention a diverter valve for use in an annular flow duct includes pivotable valve means comprising, in combination, a pair of flat side lobes on opposite sides of the duct and extending between the inner edges of the lobes towards either end thereof and transverse portions which pass over and under the inner wall of the annular duct, the margins of the valve means being shaped to substantially seal against the inner and outer walls of the annular duct when the valve occupies a first position.

Preferably the transverse portions of the valve means are curved to lie flush with the inner wall of the duct when the valve occupies a second position in which position the side lobes also lie parallel to the axis of the duct.

BRIEF DESCRIPTION OF THE DRAWINGS

The present invention and one embodiment of the valve will now be described in more detail, by way of example only, with reference to the accompanying drawings in which:

FIGS. 1 and 2 are part sectioned schematic views of a tandem fan engine showing the diverter valve in parallel-flow and series-flow modes respectively, FIG. 3 is a detailed isometric view of the diverter valve of FIG. 1 in the parallel-flow position, and FIG. 4 is a sectioned side view corresponding to FIG. 3.

DETAILED DESCRIPTION OF THE PREFERRED EMBODIMENT

Referring to FIG. 1 and 2 there is shown a tandem fan gas turbine engine (10) comprising in flow series a first axial flow compressor (12), a fluid flow duct (14) a second axial flow compressor (16), combustion means (18), turbine means (20) connected by shafts (not shown) to drive the compressors (12 and 16), a jet pipe (22) and a rear exhaust nozzle (14).

The diverter valve (26) is located between the tandem fans or compressors (12 and 16) and therefore is housed within the flow duct (14). Drive to the front fan (12) is therefore carried by means of an axial forward extending shaft (see FIG. 1) which passes through the duct (14) and is surrounded by an inner cylindrical housing or wall (28). The duct is further defined by an outer co-axial cylindrical wall (30). The duct (14) is therefore annular in transverse section. One end of duct (14), towards the left in the drawings, is in open communication with the rear of the first fan (12) to receive fluid flow therefrom and the opposite end of the duct, towards the right in the drawings, is in open communication with the front face of the second fan (16) to supply fluid to the core engine.

The duct (14), in addition to housing the diverter valve (26), is also provided in its outer wall (30) with apertures (32 and 34) which may be selectively opened and closed. For simplicity in the drawings the apertures are illustrated as having sliding covers or doors (36 and 38) respectively, although it should be understood that in practice other means of closure may be provided for example shutters. In an alternative arrangement each aperture is provided with closure means comprising a plurality of movable slats or vanes which are disposed transversely, with respect to the longitudinal axis of the engine, and which are mounted for pivotal movement each about its lengthwise axis. The slats or vanes may be shaped in section to help entrain air into the duct in the open position. In the closed position the slats may overlap slightly or the front and trailing edges may abut in order to effectively seal the apertures.

In FIG. 1 the covers (36 and 38) are slid to positions which open the apertures (32 and 34), while in FIG. 2 the are shown in their alternative positions closing the apertures. The apertures, as can be seen from FIG. 1, are offset in opposite directions with respect to the axis of the diverter valve (26) so that, when the valve is deployed as in FIG. 1, aperture (32) is downstream of the valve while aperture (34) is upstream of the valve. Thus, when the engine and consequently both fans are operating with the diverter valve raised as shown the upstream aperture 34 becomes an auxiliary outlet for flow leaving the front fan while the downstream aperture 32 acts as an auxiliary inlet permitting the second fan to draw ambient air into the core engine.

Constructional details of the diverter valve (26) can best be seen in FIGS. 3 and 4, basically the movable valve member or members pivot about a transverse axis in the duct (14) in the manner of a butterfly valve. The valve (26) comprises a pair of side lobes (40 and 42) disposed on either side of the inner axial cylindrical wall (28). These side lobes consist of flat plates pivotally and symmetrically mounted for rotation about a common axis (44) which also passes perpendicularly through the axis of the duct (14). The plates (40 and 42) have straight sides along their inner margins adjacent to the inner wall (28) of the annular duct so that in the first or raised position of the valve as shown in FIGS. 3 and 4 these sides are tangential to the wall (28) at the points of intersection with the rotational axis (44). The shape of the lobes (40 and 42) is of a section of an ellipse defined by an oblique section through the outer wall (30) of the duct. Thus, when the valve is raised to its first position the outer margins (46 and 48) of the lobes contact the inner surface of the outer wall (30) on a corresponding oblique section. Sealing means may be provided along these outer margins.

The valve member further comprises curved plates (50 and 52) which straddle the inner cylindrical wall (28) with one plate passing over and the other plate under passing the wall 28 between the inner edges of the side lobes respectively above and below the rotational axis (44). The curvature of these plates has substantially the same radius of that of the inner wall (28) of the annular duct (14) so that they lay flush with the wall (28) in the lowered or second position of the valve.

In the end view the curved plates (50 and 52) are semicircular so that their sides extend as far as the centre line of the duct. The plates are also spaced apart axially on either side of transverse pivotal axis (44) which bisects the side lobes (40 and 42). Thus, when the lobes (40 and 42) and the curved straddling section (50 and 52) are all lowered in the second position of the diverter valve the sides of the plates (50 and 52) meet the inner edges of the lobes (40 and 42) from above and below respectively. The adjacent edges of these four members (40, 42, 50 and 52) may be rigidly joined to form a single composite valve member so that all parts move in unison. Rotary actuation means 54 is provided operatively connected to rotate the valve about axis (44). Alternatively, the four members may be separately mounted for movement about the pivotal axis (44). The separate members may be raised and lowered independently but it is preferred that they are actuated in unison.

The inner and outer margins (56 and 58) of curved plate (50), and margins (60 and 62) of curved plate (52), that is their proximal and distal edges having regard to their pivotal mounting, are required to sealingly engage the inner and outer walls (28 and 30) of the annular duct (14) in the first or raised position of the valve (26). Thus, the loci of these edges is determined by the intersection at an inclined angle of the surfaces of three cylinders of different radii. The outer duct wall (30) comprises a first cylinder of larger radius and the inner duct wall (28) comprises a second cylinder of small radius disposed co-axially with respect to the first cylinder. The valve member (14) can be considered as two halves of a third cylinder of the same radius as the second cylinder but disposed with its axis inclined relative to the axis of the other two cylinders. The loci of the distal edges (58 and 60) are defined by the intersection of the third part-cylindrical surfaces with the second cylindrical surface. In order to effect efficient sealing these edges may be provided with lip seal means (not shown in the drawings).

If a certain degree of leakage past the valve (26) may be tolerated or is desired, the shape of the edges of the curved plates may be simplified as one way of achieving this. For example, the proximal edges (56 and 60) of the curved straddle plates (50 and 52) instead of following the intersection loci of two oblique cylinders alternatively may be formed according to the intersection of one cylinder by a plane perpendicular to its axis. This would generate roughly triangular shaped gaps between each curved plate and the inner duct wall in the region of the pivotal axis.

For the purpose of flow diversion when the valve (26) is raised apertures (32 and 34) are formed in the outer duct wall (30) on opposite, that is upstream and downstream, sides of the valve. Aperture closure means in the form of sliding doors (36 and 38) operated by actuating means (72 and 74) to open and close the doors is synchronised with operation of valve actuation means (54). Alternative aperture closure means such as shutters or hinged flaps may be provided for selectively opening and closing the apertures.

Operation of the aperture closing means in combination with the diverter valve will be readily appreciated by comparison of FIGS. 1 and 2 which show the valve raised and lowered respectively. When the diverter valve (26) is lowered as in FIG. 2 the aperture doors are arranged to be closed and fluid flows virtually unimpeded along the duct (14). In this position the side lobes (40 and 42) of the valve are arranged to be aligned with the flow direction so as to present minimum disturbance.

In FIG. 1, however, the valve (26) is raised and constitutes an effective block to airflow along the duct (14) from the front fan towards the second fan. The aperture doors are arranged to be open and air passed into the duct by the front fan (12) is able to exit the duct (14) through the aperture (34) upstream of the valve (26). The aperture (32) downstream of the valve is also open allowing ambient air to be drawn into the duct by the second fan (16). The apertures (32 and 34) thus constitute auxiliary inlets and outlets respectively.

I claim:

1. A diverter valve for use in an annular flow duct defined by inner and outer concentric duct walls comprising:
   a single valve member movable between a first blocking position in which the valve member stems flow along the duct and a second position in which the valve member causes minimum obstruction to flow in the duct,
   the valve member comprising four integral sections which surround the inner duct wall, these four sections comprising a pair of flat side lobes on opposite sides of the inner duct wall and a pair of semi-cylindrical members spaced apart towards opposite distal ends of the side lobes and curving in opposite directions with radii substantially conforming to an inner duct wall curvature,
   a pivot axis lying transversely across the duct perpendicular to the duct axis, and about which the valve member is pivoted,
   the valve member being dimensional such that in the first blocking position, edges of the four valve member sections abut the inner and outer duct walls, and in the second position, the semi-cylindrical members of the valve lie flush with the inner duct wall.

2. A diverter valve as claimed in claim 1 wherein the flat side lobes are pivotable about the transverse pivot axis which bisects the lobes and in the second valve position the lobes lie parallel to the axis of the duct.

3. A diverter valve as claimed in claim 1 wherein the semi-cylindrical member and the side lobes are joined to move in unison about the pivot axis.

4. A diverter valve as claimed in claim 1 wherein the outer wall of the duct is formed with two apertures positioned relative to the valve member so that when the valve occupies the blocking first position the apertures lie on opposite sides of the valve member.

5. A diverter valve as claimed in claim 4 wherein further means are provided for closing said apertures.

6. A diverter valve as claimed in claim 5 wherein the means for closing said apertures is operated in synchronism with means for pivoting the valve member such that when the valve member occupies the first blocking position the apertures are open and when the valve member occupies the second position the apertures are closed.

7. A gas turbine engine comprising:
first and second compressors,
a flow duct defined by substantially co-axial inner and outer duct walls interconnecting said compressors, the duct receiving fluid from the first compressor and delivering fluid to the second compressor,
a single diverter valve housed within the duct and comprising a valve member movable between a first blocking position in which the valve member stems flow along the duct and a second position in which the valve member causes minimum obstruction to flow in the duct,
the valve member comprising four integral sections which surround the inner duct wall, these four sections comprising a pair of flat side lobes on opposite sides of the inner duct wall and a pair of semi-cylindrical members spaced apart towards opposite distal ends of the side lobes and curving in opposite directions with radii substantially conforming to an inner duct wall curvature,
a pivot axis lying transversely across the duct perpendicular to the duct axis, and about which the valve member is pivoted,
the valve member being dimensional such that in the first blocking position, edges of the four valve member sections abut the inner and outer duct walls and in the second position, the semi-cylindrical members of the valve lie flush with the inner duct wall.

8. A gas turbine engine as claimed in claim 7 wherein the semi-cylindrical members of the valve member are curved to lie flush with the inner wall of the annular duct interconnecting the first and second compressors when the valve occupies the second position.

9. A gas turbine engine as claimed in claim 8 wherein the flat side lobes are pivotable about the pivot axis which bisects the lobes and in the second position the lobes lie parallel to the axis of the duct.

10. A gas turbine engine as claimed in claim 9 wherein the semi-cylindrical member and the side lobes are joined to move in unison about the pivot axis.

11. A gas turbine engine as claimed in claim 7 wherein the outer wall of the duct is formed with two apertures positioned relative to the valve member so that when the valve occupies the first blocking position the apertures lie on opposite sides of the valve member, and afirst of said apertures communicates with the downstream face of the afirst compressor and the second of the apertures communicates with the upstream face of the second compressor.

12. A gas turbine engine as claimed in claim 11 wherein further means are provided for closing said apertures.

13. A gas turbine engine as claimed in claim 12 wherein the means for closing said apertures is operated in synchronism with means for pivoting the valve member such that when the valve member occupies the first blocking position said first and second apertures are open and when the valve member occupies the second position said first and second apertures are closed.

14. A gas turbine engine as claimed in claim 13 wherein said first aperture comprises an auxiliary air inlet positioned to admit air to the second compressor when the valve is in the said first blocking position and said second aperture comprises an auxiliary outlet to exhaust fluid from the first compressor.

* * * * *